Oct. 31, 1967        R. L. SENGBUSH        3,350,683
OPTIMUM DETECTOR TYPE AND DEPTH IN MARINE SEISMIC EXPLORATION
Filed March 8, 1966                    3 Sheets-Sheet 1

Oct. 31, 1967   R. L. SENGBUSH   3,350,683
OPTIMUM DETECTOR TYPE AND DEPTH IN MARINE SEISMIC EXPLORATION
Filed March 8, 1966   3 Sheets-Sheet 2

United States Patent Office 3,350,683
Patented Oct. 31, 1967

3,350,683
OPTIMUM DETECTOR TYPE AND DEPTH IN MARINE SEISMIC EXPLORATION
Raymond L. Sengbush, Grand Prairie, Tex., assignor to Mobil Oil Corporation, a corporation of New York
Filed Mar. 8, 1966, Ser. No. 532,730
4 Claims. (Cl. 340—7)

This invention relates to marine seismic exploration and, more particularly, to a method of reducing the amplitude of water reverberations in marine seismograms.

Reverberations in marine seismograms are a serious problem in seismic exploration. A water layer overlying the subsurface strata introduces reverberations which often obscure the primary reflections of seismic energy from the subsurface strata. Because of the differences in density and seismic velocity of water relative to the underlying strata, an unusually high reflection coefficient often exists at the bottom of a water layer. Also, the water layer possesses little effective attenuation. Because of this, some of the seismic energy bounces between the surface and the bottom of the water layer causing reverberations in the marine seismograms.

Many techniques have been proposed and utilized for suppressing reverberations in marine seismograms. For example, in an article by M. M. Backus, Geophysics, vol. 24, pages 233-261, entitled, "Water Reverberations— Their Nature and Elimination," 1959, there is set forth the filtering characteristics of the reverberation-producing water layer. After determining these filter characteristics, an inverse water layer filter can be determined so that when the marine seismograms are processed through this inverse filter, the reverberations are removed. This and other processing techniques have been successful in removing reverberations from recorded seismograms. However, in accordance with the present invention, it is possible to reduce the amplitude of water reverberations during the seismic exploration and before the seismogram is even recorded. In this manner, there is recorded a marine seismogram in which the reverberation problem is substantially reduced, thereby faciliating the identification and interpretation of primary reflections on the seismograms.

It is an important object of the present invention to utilize the proper type of detector and maintain it at an optimum depth during marine exploration in order to reduce the amplitude of reverberations.

As discussed above, the water layer can be characterized as a filter having an amplitude spectrum with peaks at a fundamental reverberating frequency and at harmonics of this fundamental reverberating frequency. Furthermore, a detector placed at a particular depth in the water layer to detect the seismic energy introduces an additional filter in cascade with the water layer filter. This filter has peaks and notches in its amplitude spectrum which are determined by the type of detector and the depth at which it is placed. In accordance with an important aspect of this invention, the detector type and the depth are selected so that notches in the detector-depth filter occur at the same frequencies as the peaks in the water layer filter.

The foregoing and other objects, features and advantages of the present invention will be better understood from the following detailed description and appended claims in conjunction with the drawings in which:

Figure 1:
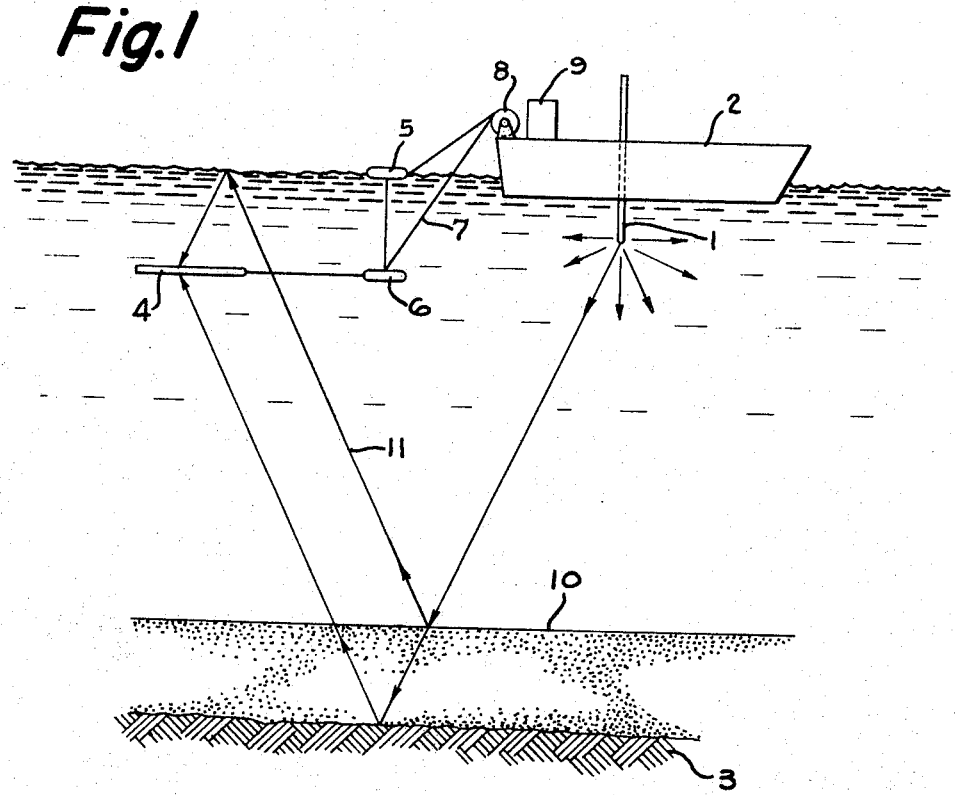
FIG. 1 depicts a method of marine seismic prospecting.

Referring to FIG. 1, there is shown a method of marine seismic exploration in which a seismic source 1 is mounted on a boat 2 and is adapted to produce seismic waves which travel downwardly to subsurface reflecting interfaces such as that shown at 3 and back to a detector 4 which is towed behind the boat. Detector 4 is shown in the form of an elongated streamer and may be of the type disclosed in Patent 2,923,916 to John H. Woodworth, a coworker of applicant. Numerous other types of detectors may be utilized as will be subsequently explained. Detector 4 is towed behind boat 2 and is maintained at a predetermined known depth by a surface vane 5 coupled to a diving vane 6. A cable 7 extends from the detector and diving vane to a reel 8 mounted on the boat. This cable includes conductors for conveying seismic signals from the detector to a surface recorder indicated at 9. While the use of a surface vane 5 and a diving vane 6 is one technique for maintaining the detector 4 at a predetermined depth, there are other techniques. One particularly suitable technique for maintaining the detector at a particular depth is disclosed in application Ser. No. 288,180, filed June 17, 1963, and now abandoned, entitled, Depth Control System for Marine Seismic Surveying, to George B. Loper and Julius Podhrasky, Jr., coworkers of applicant.

As shown in FIG. 1, a portion of the seismic energy is reflected from the water bottom 10 as indicated by the ray path 11. This seismic energy is reflected from the water surface and is detected by detector 4. Furthermore, the energy reflected from the surface is reflected again from the water bottom 10 and successively bounces back and forth between the water bottom 10 and the surface to form a series of multiple reflections of the initial seismic pulse. These multiple reflections produce reverberations on marine seismograms. The reverberations often obscure the primary reflections from the subsurface strata characteristics the geophysicist is attempting to determine.

In accordance with this invention, there is provided a technique for reducing the amplitude of these reverberations by maintaining the detector 4 at a predetermined depth and by utilizing a detector of proper type. The depth and detector type are selected in accordance with the following.

Figure 2:
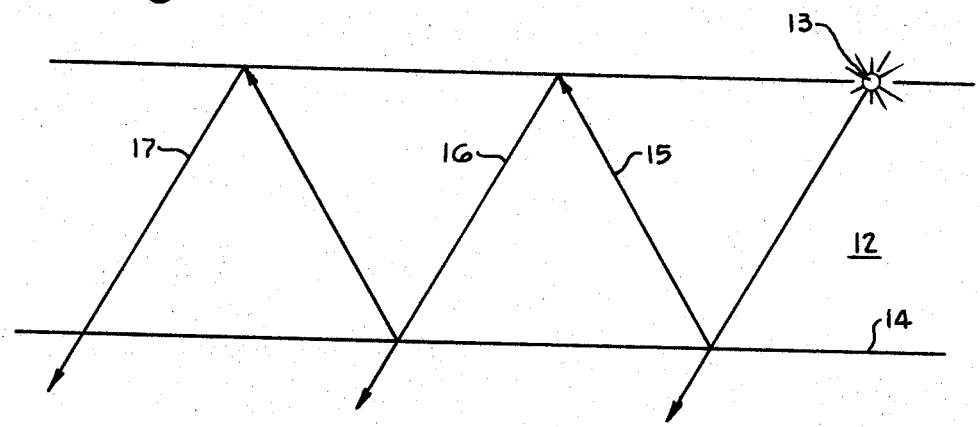
FIG. 2 shows the ray paths of seismic energy producing reverberations.

The water layer producing the reverberations has the characteristics of a filter which can best be described with reference to FIG. 2. In FIG. 2, there is shown a water layer 12. The initial pulse of seismic energy from the source 13 travels to the bottom of the water and is partially transmitted and partially reflected by the bottom 14. The transmitted part is reflected by subsurface strata beneath the water to become the primary reflections. The waves reflected from the bottom, indicated by the ray path 15, travel to the surface where they are again reflected to the water bottom as indicated by the ray path 16. The process continues because the water layer possesses little effective attenuation. Each time a pulse of seismic energy bounces between the surface and the bottom of the water, a pulse emerges, from the boundary at the bottom to follow the initial pulse. These multiple pulses are delayed equal time intervals relative to each other and their amplitudes are successively reduced by the reflection coefficient of the bottom 14. Furthermore, the multiple reflections alternate in polarity because the interface between the water and the air has a reflection coefficient which approximates −1. The result of this is to produce a seismogram in which each primary reflection is followed by a train of equally spaced multiple reflections alternating in polarity, each multiple reflection being reduced by a factor proportional to the reflection coefficient of the bottom 14 from the previous multiple reflection.

The primary pulse of seismic energy will herein be denoted $\delta(t)$. Assuming that the bottom 14 is hard, that is, it has a positive reflection coefficient, the first multiple, depicted by the ray path 16, can be denoted:

$$-R_W\delta(t-T_W)$$

where:

—$R_W$ is the product of the reflection coefficient at the water-air interface and the reflection coefficient of the bottom 14, and $T_W$ is the two-way travel time of seismic energy between the surface and the bottom of the water layer.

Similarly, the second multiple, depicted by the ray path 17 in FIG. 2, can be represented as $R_W^2\delta(t-2T_W)$. Since this process continues, the primary pulse and resultant multiples are denoted by:

$$h_1(t)=\delta(t)-R_W\delta(t-T_W)+R_W^2\delta(t-2T_W)\\+ \ldots +R_W^n\delta(t-nT_W)+ \ldots$$

where $n$ is an integer index.

At the detector, each arriving pulse $\delta(t)$ is multiple-reflected within the water layer. It can be shown that the received train of pulses is identical to $h_1(t)$, and that the overall effect of the water layer is characterized by the water layer filter $h(t)=h_1(t)*h_1(t)$, where * indicates convolution.

Figure 3:
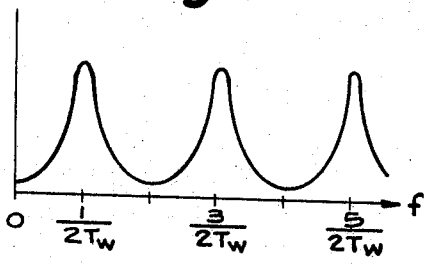
FIG. 3 shows the amplitude spectrum of a water layer filter having a hard bottom.
Figure 4:
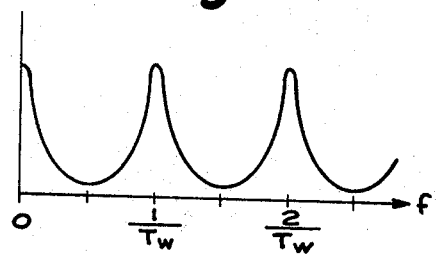
FIG. 4 shows the amplitude spectrum of a water layer filter having a soft bottom.

The foregoing is a representation in the time domain of a filter having an amplitude spectrum shown in FIG. 3. That is, when an impulse is applied to such a filter, the output amplitude as a function of frequency will be that shown in FIG. 3 for the case where the water layer has a hard bottom. When the water layer has a soft bottom, the amplitude spectrum is of the type shown in FIG. 4.

Note that in FIG. 3, the amplitude spectrum has peaks at the fundamental reverberation frequency $$f_1=\frac{1}{2T_W}$$

and at the odd harmonics of this fundamental reverberation frequency. For the soft bottom case shown in FIG. 4, the amplitude spectrum has peaks at the even harmonics of the fundamental reverberation frequency.

In addition to the water layer filter effect discussed above, there is another distortion filter effect. This is referred to as the detector-depth filter and it can be considered to be in cascade with the water layer filter.

The filtering effect of receiver depth is dependent upon the type of receiver used. Seismic receivers, or detectors, are referred to as being of the velocity type or of the pressure type. A velocity type detector is responsive to the velocity of impinging seismic waves and produces an electrical signal proportional to the velocity of these waves. A pressure type detector is responsive to the pressure of the acoustic wave and produces an electrical output proportional to pressure. Detectors of the pressure type and velocity type are well known in the art.

Figure 5:
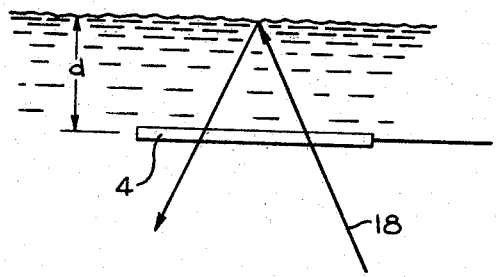
FIG. 5 is a portion of FIG. 1 showing a seismic wave impinging upon the detector.
Figure 5A:
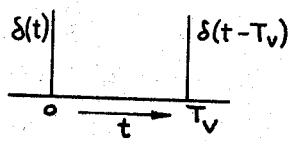
FIG. 5a is the time domain representation of the detector-depth filter when a velocity type detector is used.

To demonstrate the type of electrical output produced by a velocity type filter towed at depth, a portion of FIG. 1 showing the detector 4 has been reproduced in FIG. 5. In FIG. 5 a seismic wave reflected from a subsurface interface is denoted 18. This wave impinges upon detector 4 and the increase in velocity associated therewith produces an output with a polarity which will be defined as positive. As shown in FIG. 5, the wave 18 is reflected from the surface of the water and again impinges upon the detector 4 in a down-going direction. The increase in velocity associated with this down-going wave again produces a positive output from detector 4. The two positive-going outputs from the detector 4 are spaced apart in time by an amount equal to the two-way travel time between the surface and the detector. This two-way travel time $T_V$ is related to the depth $d$ at which the detector is towed by:

$$T_V=\frac{2d}{V_W}$$

where: $V_W$ is the velocity of the seismic waves in water. The two outputs from the velocity detector can be depicted in the time domain as shown in FIG. 5a. In FIG. 5a the two outputs are represented as two impulses of positive polarity and spaced apart in time by $T_V$.

Figure 5B:
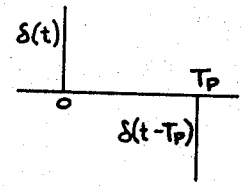
FIG. 5b is the time domain representation of the detector-depth filter when a pressure type detector is used.

On the other hand, if the detector 4 is a pressure type detector, outputs of different polarities will be produced by the up-going and down-going waves. If the up-going wave 18 is a compression, the wave reflected from the surface will be a rarefaction. The up-going wave will produce an output from the pressure detector which is defined as a positive impulse and the down-going wave, a rarefaction, will produce an output of the opposite polarity. The representation of these two outputs in the time domain is as shown in FIG. 5b. In this case, the initial positive-going impulse $\delta(t)$ is followed by a negative-going impulse $\delta(t-T_P)$, where $T_P$ is the two-way travel time between the detector and the surface.

Figure 6:
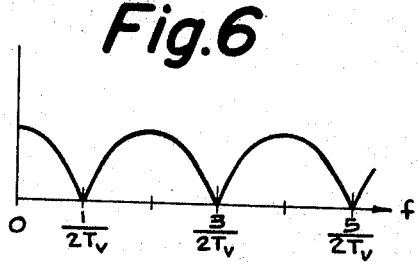
FIG. 6 shows the amplitude spectrum of the detector-depth filter when a velocity detector is used.
Figure 7:
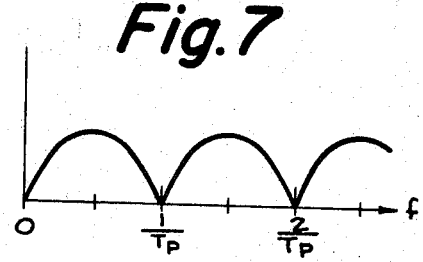
FIG. 7 shows the amplitude spectrum of the detector-depth filter when a pressure detector is used.

The amplitude spectra of the detector-depth filter is shown in FIG. 6 for a velocity detector and the amplitude spectra of the detector-depth filter is shown in FIG. 7 for a pressure detector. The detector-depth filter has notches in the amplitude spectrum at $$f=\frac{m}{T_P}$$

for pressure detectors and at $$f=\frac{2m-1}{2T_V}$$

for velocity detectors, where $m$ is any integer.

In accordance with the present invention, water layer reverberations are suppressed before recording by towing the proper type detector at a depth which will produce notches in the detector-depth filter at the same frequencies as the peaks in the water layer filter.

Referring back to FIGS. 3 and 4, note that peaks in the water layer filter occur at $$f=\frac{2k-1}{2T_W}$$

in the hard bottom case, and $$f=\frac{k}{T_W}$$

in the soft bottom case, where $k$ is any integer. If the reverberating layer is equivalent in thickness to the water layer, then velocity detectors towed at the water bottom so that $T_V=T_W$ will produce notches in the detector-depth filter at every peak in the water layer filter if the bottom is hard. Similarly, pressure detectors towed at the water bottom so that $T_P=T_W$ will produce notches in the detector-depth filter at each peak in the water layer filter if the bottom is soft.

Often, however, the effective bottom of the reverberating water layer is not actually at the bottom of the water. For example, because of mud on the bottom, the effective reflecting surface may be at a distance below the mud where it is impossible to tow a detector. Even where it is not possible to place the detector at the effective bottom of the reverberating layer, it is still possible to suppress the predominant reverberation frequency. For example, consider the case where the predominant reverberation frequency is the third harmonic, $$f = \frac{3}{2T_W}$$

A velocity detector positioned at a depth such that $$T_V = \frac{T_W}{3}$$

will produce a filter effect in which the first notch in the amplitude spectrum is at a frequency of $$\frac{1}{2T_V}$$

Since $$T_V = \frac{T_W}{3}$$

this notch in the detector-depth filter is at a frequency of $$\frac{3}{2T_W}$$

coinciding with the peak in the water layer filter at the third harmonic. Since the water layer filter and the detector-depth filter are in cascade, the predominant reverberation, the third harmonic, is suppressed. Alternatively, a pressure detector may be positioned at a depth such that $T_P = \frac{2}{3} T_W$. In this case the detector-depth filter will also have a notch at the predominant reverberation frequency, i.e., the third harmonic. In general, the conditions that must be fulfilled for reverberation suppression are summarized below.

|  | Pressure | Velocity |
|---|---|---|
| Soft Bottom | $T_P = \frac{m}{k} T_W$ | $T_V = \frac{2m-1}{2k} T_W$ |
| Hard Bottom | $T_P = \frac{2m}{2k-1} T_W$ | $T_V = \frac{2m-1}{2k-1} T_W$ | where: $m$ and $k$ are any integers.

In the foregoing summary, $k$ must be equal to or greater than $m$ to avoid the impossible condition of having $T_V$ or $T_P$ greater than $T_W$. For the same reason, where a pressure detector is used with a hard bottom, $k$ must always be greater than $m$. All of the other conditions summarized above will produce suppression of one or more of the harmonics of the reverberation frequency. A selection of the proper conditions to suppress the predominant reverberation frequency may be made. In this manner, good suppression of reverberations before recording is obtained. In carrying out the invention, an estimate of $T_W$ may be obtained from a fathometer reading. A more accurate estimate of $T_W$ can be obtained by analysis of seismic data in the area.

The technique of using the detector-depth filter to suppress the predominant harmonic is particularly effective when used in conjunction with a band-pass filter to suppress other selected harmonics. FIGS. 8a–8d depict the effect on seismograms of utilizing the detector-depth filter to suppress the third harmonic in records obtained from a hard bottom water layer. This technique was used in conjunction with a band-pass filter to suppress the fifth harmonic.

Figures 8A, 8B, 8C, 8D:
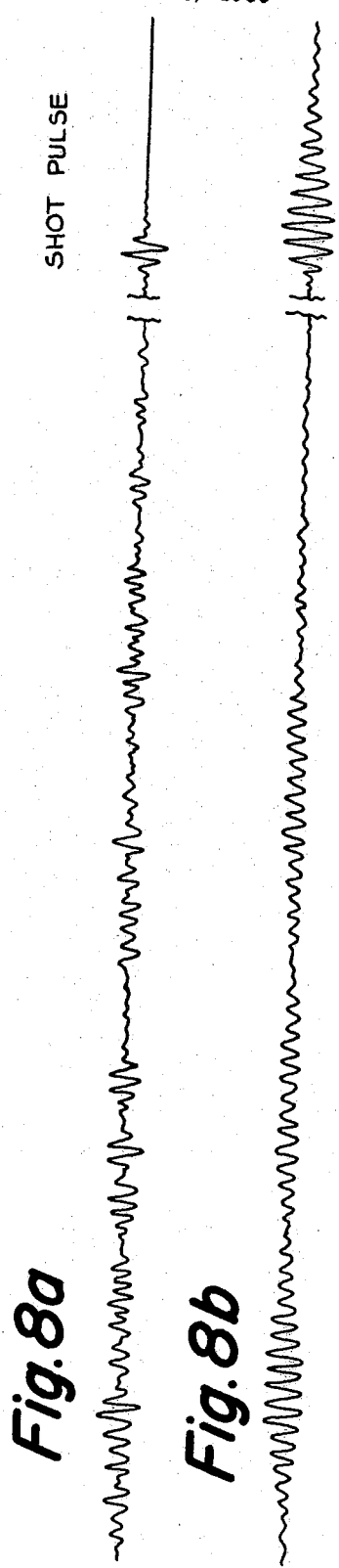
FIG. 8a depicts a marine seismogram having no reverberations.
FIG. 8b depicts a marine seismogram where the principles of this invention are not used.
FIG. 8c shows a marine seismogram obtained from a pressure type detector positioned at the proper depth to suppress reverberations.
FIG. 8d depicts a marine seismogram obtained from a velocity type detector towed at a proper depth to suppress reverberations.

FIGS. 8a–8d depict records obtained over a water layer having a two-way travel time of $T_W = 42$ milliseconds and in which the effective reflecting bottom has a reflection coefficient of $R_W = 0.6$. FIG. 8a shows the idealized seismogram which should be obtained if there were no reverberations. FIG. 8b shows the seismogram obtained with the detector towed at a depth of 15 feet, that is, at a depth such that the two-way travel time between the detector and the surface equals $T_W/7$. Note the predominant reverberations which obscure the reflections in the seismogram. These reverberations are particularly noticeable with reference to the idealized shot pulses shown at the right-hand side of the figures.

When the proper type detector is towed at the depth determined in accordance with this invention, suppression of reverberations is obtained as shown in FIGS. 8c and 8d. FIG. 8c depicts a seismogram obtained with a pressure type detector towed at a depth such that $T_P = \frac{2}{3} T_W$. FIG. 8d depicts a seismogram obtained with a velocity detector towed at a depth such that $T_V = \frac{1}{3} T_W$.

These records were obtained by using a band-pass filter to suppress the fifth harmonic which in this case was 65 c.p.s. (Since $T_W = 42$ milliseconds, the fundamental reverberating frequency is given by:

$$f_1 = \frac{1}{2T_W} = \frac{1}{84 \text{ ms.}} = 13 \text{ c.p.s.}$$

and the fifth harmonic is 65 c.p.s.) The foregoing demonstrates the effectiveness of using a particular type detector-depth filter in conjunction with bandpass filters. It will be appreciated that a band-pass filter could not be used to suppress all of the harmonics of the reverberating frequency because such filters cannot be used to suppress frequencies in the seismic band of interest without losing valuable information.

While a particular embodiment of the invention has been shown and described, it will, of course, be understood that various modifications may be made without departing from the true spirit and scope of the invention. Any such modifications are, therefore, intended to be covered by the appended claims.

What is claimed is:

1. The method of marine prospecting near the surface of a water layer overlaying a soft bottom having a negative reflection coefficient, said layer of water having a depth such that the two-way travel time of seismic energy between said surface and said bottom is $T_W$, said method comprising:
   generating seismic energy near said surface which will penetrate and be reflected from subsurface strata, said seismic energy also being reflected between said bottom and said surface to produce reverberations,
   towing a pressure type seismic detector through said water layer at a depth such that the two-way travel time $T_P$ of seismic energy between said surface and said detector is given by:

$$T_P = \frac{m}{k} T_W$$

where $m$ and $k$ are integers and $k$ is equal to or greater than $m$,
   detecting the reflected seismic energy in said detector, and
   recording the detected seismic energy.

2. The method of marine prospecting near the surface of a water layer overlaying a hard bottom having a positive reflection coefficient, said layer of water having a depth such that the two-way travel time of seismic energy between said surface and said bottom is $T_W$, said method comprising:
   generating seismic energy near said surface which will penetrate and be reflected from subsurface strata, said seismic energy also being reflected between said bottom and said surface to produce reverberations,
   towing a pressure type seismic detector through said water layer at a depth such that the two-way travel time $T_P$ of seismic energy between said surface and said detector is given by:

$$T_P = \frac{2m}{2k-1}T_W$$

where $m$ and $k$ are integers and k is greater than $m$, detecting the reflected seismic energy in said detector, and recording the detected seismic energy.

3. The method of marine prospecting near the surface of a water layer overlaying a soft botom having a negative reflection coefficient, said layer of water having a depth such that the two-way travel time of seismic energy between said surface and said bottom is $T_W$, said method comprising:

generating seismic energy near said surface which will penetrate and be reflected from subsurface strata, said seismic energy also being reflected between said bottom and said surface to produce reverberations, towing a velocity type seismic detector through said water layer at a depth such that the two-way travel time $T_V$ of seismic energy between said surface and said detector is given by:

$$T_V = \frac{2m-1}{2k}T_W$$

where $m$ and $k$ are integers and $k$ is equal to or greater than $m$, detecting the reflected seismic energy in said detector, and recording the detected seismic energy.

4. The method of marine prospecting near the surface of a water layer overlaying a hard bottom having a positive reflection coefficient, said layer of water having a depth such that the two-way travel time of seismic energy between said surface and said bottom is $T_W$, said method comprising:

generating seismic energy near said surface which will penetrate and be reflected from subsurface strata, said seismic energy also being reflected between said bottom and said surface to produce reverberations, towing a velocity type seismic detector through said water layer at a depth such that the two-way travel time $T_V$ of seismic energy between said surface and said detector is given by:

$$T_V = \frac{2m-1}{2k-1}T_W$$

where $m$ and $k$ are integers and $k$ is equal to or greater than $m$, detecting the reflected seismic energy in said detector, and recording the detected seismic energy.

References Cited

UNITED STATES PATENTS

| | | | |
|---|---|---|---|
| 2,465,696 | 3/1949 | Paslay | 181—.5 |
| 2,622,691 | 12/1952 | Ording | 181—.5 |
| 2,757,356 | 7/1956 | Haggerty | 340—7 |

BENJAMIN A. BORCHELT, *Primary Examiner.*

P. A. SHANLEY, *Assistant Examiner.*